Nov. 11, 1941.  D. R. RICHARDS  2,262,048
MINING MACHINE TRANSMISSION MECHANISM
Original Filed Nov. 5, 1937  9 Sheets-Sheet 1

Inventor:
Dwight R. Richards
by Louis A. Maxson,
Atty.

Nov. 11, 1941.    D. R. RICHARDS    2,262,048
MINING MACHINE TRANSMISSION MECHANISM
Original Filed Nov. 5, 1937    9 Sheets-Sheet 2

Inventor:
Dwight R. Richards
by Louis A. Maxson
Atty.

Nov. 11, 1941.　　　D. R. RICHARDS　　　2,262,048
MINING MACHINE TRANSMISSION MECHANISM
Original Filed Nov. 5, 1937　　　9 Sheets-Sheet 3

Inventor:
Dwight R. Richards
by Louis A. Maxson
Atty.

Nov. 11, 1941.   D. R. RICHARDS   2,262,048
MINING MACHINE TRANSMISSION MECHANISM
Original Filed Nov. 5, 1937   9 Sheets-Sheet 4

Inventor:
Dwight R. Richards
by Louis A. Maxson
Atty.

Inventor:
Dwight R. Richards
by Louis A. Maxson,
Atty.

Inventor:
Dwight R. Richards
by Louis A. Maxson
Att'y.

Nov. 11, 1941.                D. R. RICHARDS                2,262,048
                    MINING MACHINE TRANSMISSION MECHANISM
              Original Filed Nov. 5, 1937      9 Sheets-Sheet 7

Inventor:
Dwight R. Richards

Patented Nov. 11, 1941

2,262,048

UNITED STATES PATENT OFFICE 2,262,048

MINING MACHINE TRANSMISSION MECHANISM

Dwight R. Richards, Grantham, England, assignor to Sullivan Machinery Company, a corporation of Massachusetts Application November 5, 1937, Serial No. 172,994. Renewed May 2, 1940. In Great Britain December 18, 1936

16 Claims. (Cl. 74—125.5)

This invention relates to mining machines, and more particularly, but not exclusively, to improvements in the transmission mechanism of the feeding mechanism of a mining machine.

An object of this invention is to provide an improved mining machine transmission mechanism. Another object is to provide a coal mining machine having improved feeding mechanism whereby the machine may be fed and controlled in an improved manner. Another object is to provide an improved feeding mechanism for a coal mining machine of the continuous cutter, floor type whereby the machine may be fed over the mine floor during both the cutting operation and maneuvering of the machine with respect to the coal face, in an improved manner. A further object is to provide an improved feeding mechanism for a mining machine of the above character, having improved driving means for the feed operating member such that the machine may be moved over the mine floor at a slow speed during the cutting operation and at a faster speed during maneuvering of the machine with respect to the coal face prior to the commencement of the cutting operation, without injury to the driving mechanism in the event that the machine encounters an obstruction, the driving means embodying means which prevents automatically overloading of the machine. Still another object is to provide an improved feeding mechanism which embodies improved means whereby the feed operating member may be intermittently driven to produce what is called in the art a "pulsing" feed. Further objects of the invention are to provide for variation in the "pulsing" feed. Other objects and advantages of the invention will, however, hereinafter more fully appear.

In the accompanying drawings there are shown, for purposes of illustration, one form and a modification which the invention may assume in practice.

In these drawings.

In this illustrative embodiment of the invention, there is shown a coal mining machine of the flexibly fed, continuous cutter, longwall floor type, although it will be evident that various features of the invention may be incorporated in mining machines of various other types.

The machine shown herein comprises a machine frame 1 having a smooth plane bottom surface 2 and adapted to rest upon and slide in any direction over the mine floor. The frame is composed of three sections suitably rigidly secured together, viz: a central motor frame section 3, a feed frame section 4 and a cutter frame section 5. Pivotally mounted on the cutter frame section 5 is a kerf cutter comprising an elongated, horizontal plane cutter bar 6 having guided for circulation about its margin an endless cutter chain 7. Mounted for rotation on a vertical axis within the lower portion of the feed frame section is a feed operating member, herein in the form of a haulage drum 8 having wound thereon a feeding cable 9.

The transmission mechanism for driving the cutter chain may be of known character, but it is preferred that it be according to the description now to follow: Housed within the motor frame section 3 is a motor having its power shaft 10 horizontally disposed and extending longitudinally of the machine, and keyed to the rear end of the motor power shaft is a bevel pinion 11 meshing with a bevel gear 12 secured to a vertical shaft 13 suitably journaled within the cutter frame section 5. The vertical shaft also has secured thereto a spur pinion 14 which meshes with a large spur gear 15 having its hub suitably journaled on bearings supported by a vertical drive shaft 16, the latter in turn being suitably journaled within bearings supported within the cutter frame section. Keyed to the lower end of the drive shaft 16 is a chain sprocket 17 which engages and drives the endless cutter chain 7. The hub of the spur gear has clutch teeth connectible by a sliding clutch 18 to clutch teeth formed on the drive shaft 16, so that when the clutch is connected, the cutter chain may be driven by the motor through the gearing 11, 12, 14, 15, and when the clutch is released the cutter chain may remain idle during running of the motor.

Figure 3:
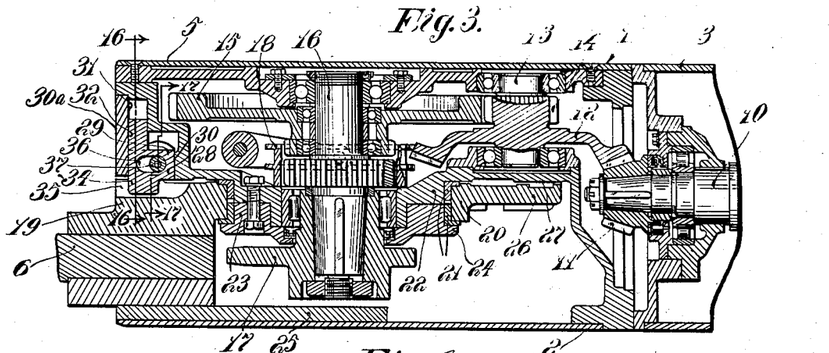
Fig. 3 is a view in longitudinal vertical section through the cutting end of the machine, taken substantially on line 3—3 of Figs. 1 and 4.
Figure 4:
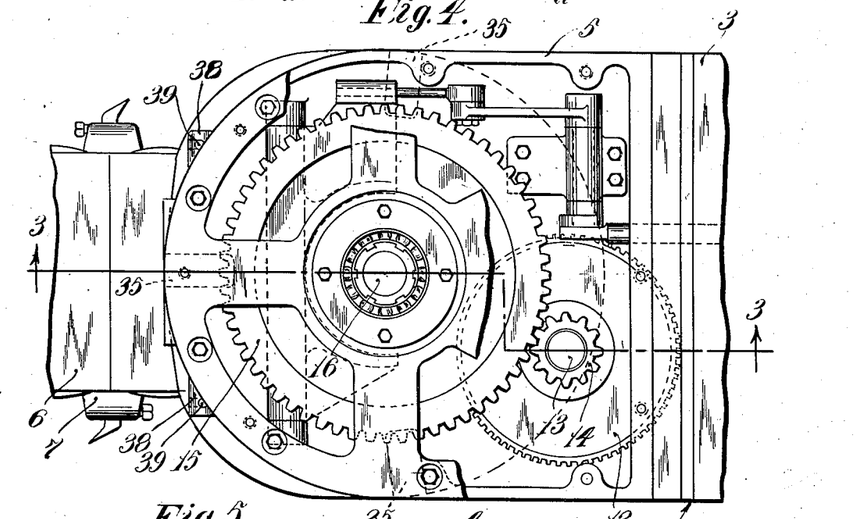
Fig. 4 is a top plan view of the machine shown in Fig. 3, with the top cover removed to show details of the internal structure.
Figure 5:
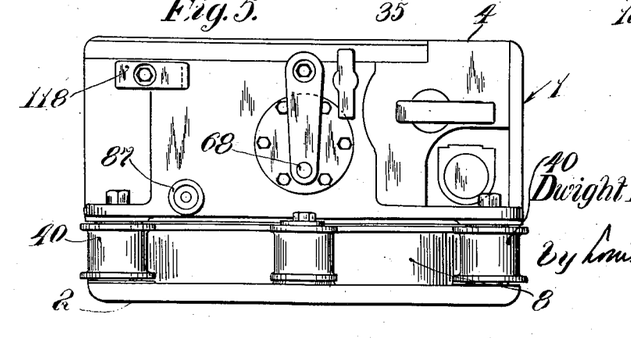
Fig. 5 is an enlarged front end elevational view of the mining machine shown in Figs. 1 and 2.
Figure 16:
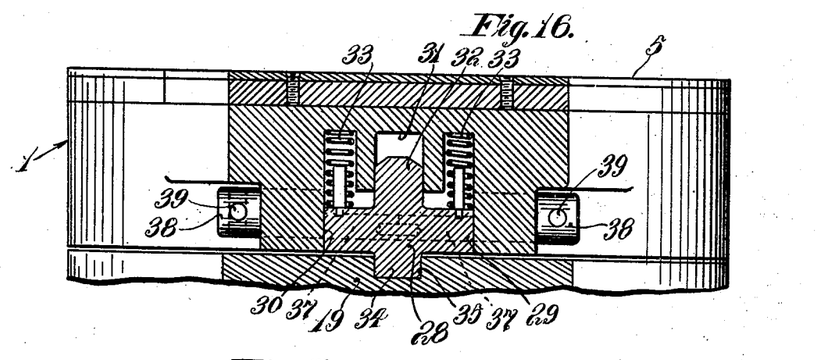
Fig. 16 is an enlarged detail vertical sectional view taken on line 16—16 of Fig. 3.
Figure 17:
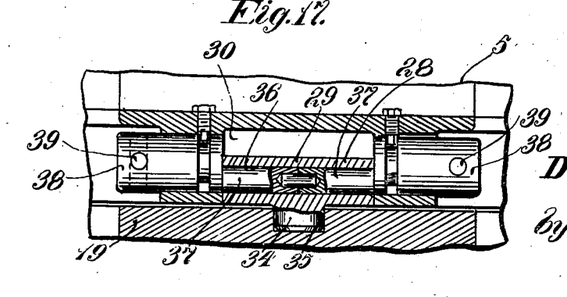
Fig. 17 is an enlarged detail vertical sectional view taken on line 17—17 of Fig. 3.
Figure 18:
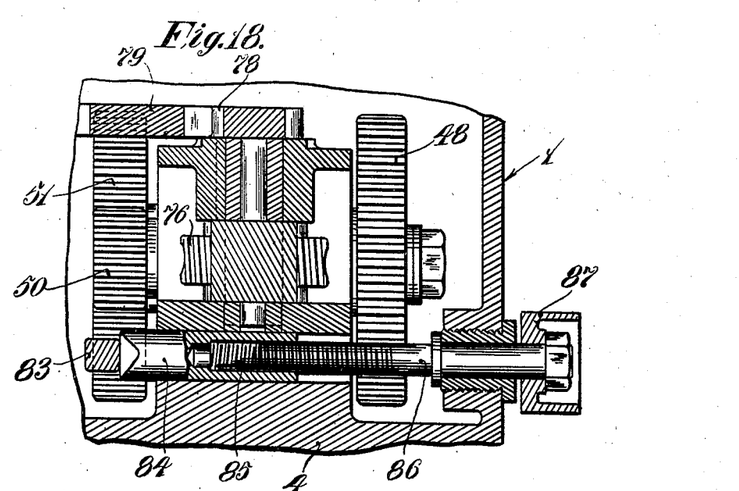
Fig. 18 is an enlarged detail view in longitudinal vertical section taken on line 18—18 of Fig. 6.
Figures 19, 20:
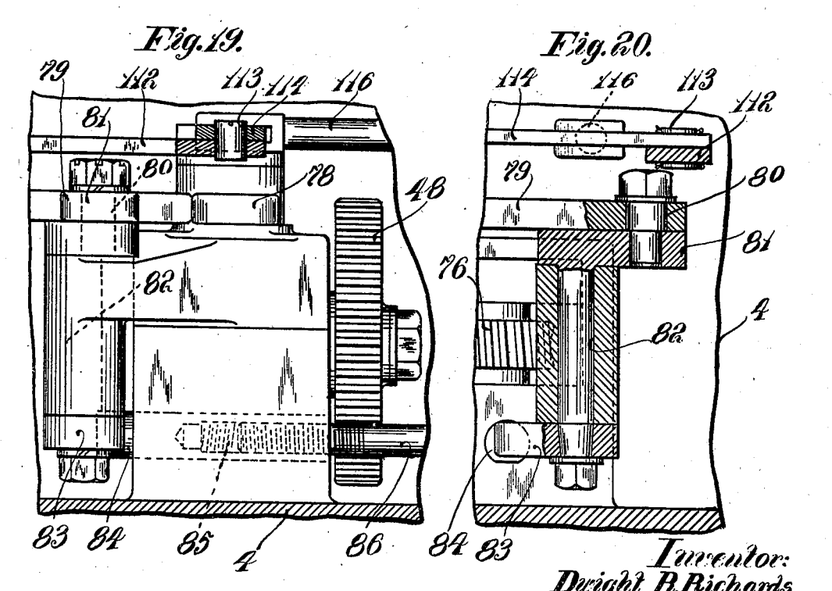
Fig. 19 is an enlarged detail vertical sectional view taken on line 19—19 of Fig. 6.
Fig. 20 is an enlarged detail view in transverse vertical section taken on line 20—20 of Fig. 6.
Figure 21:
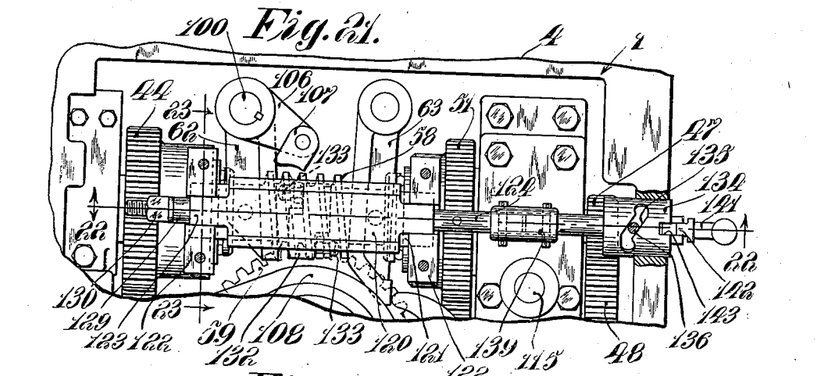
Fig. 21 is a fragmentary plan view, similar to Fig. 6, showing a modified form of construction.
Figure 22:
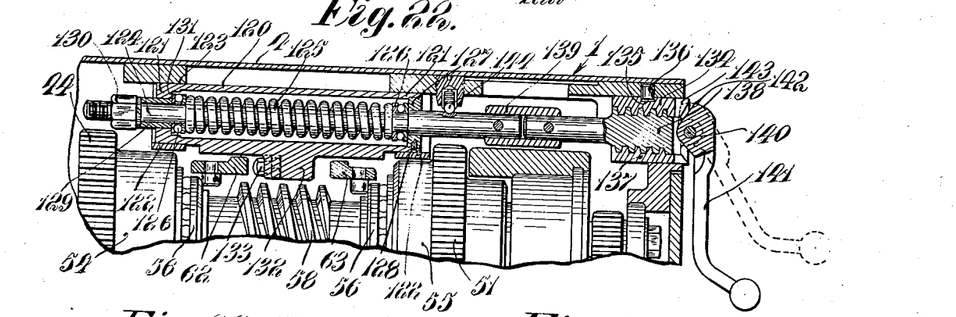
Fig. 22 is a view in longitudinal vertical section taken substantially on line 22—22 of Fig. 21.
Figure 23:
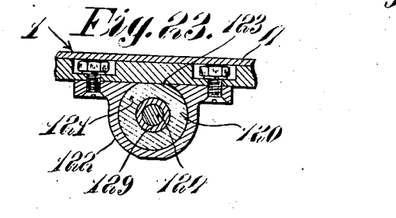
Fig. 23 is an enlarged detail sectional view taken on line 23—23 of Fig. 21.
Figure 24:
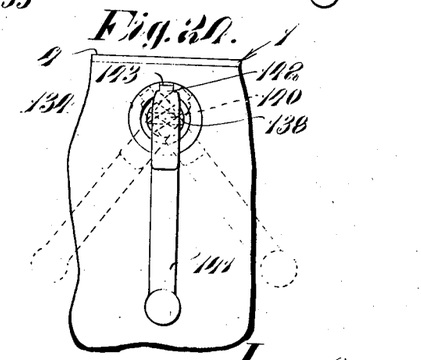
Fig. 24 is a detail view showing the clutch control handle.

The cutter bar 6 is carried by a swiveled hanger frame 19 having a circular bearing portion 20 journaled on bearing sleeves 21, 21 respectively supported by a circular bearing support 22 formed on the cutter frame section and a detachable circular bearing support 23 secured, as by bolts, to the frame portion 22, the support 23 having a bottom flange 24 underlying the lower bearing sleeve, in the manner shown in Fig. 3. The bottom of the hanger frame bears on a bottom plate 25 secured to the bottom of the cutter frame, while the upper face of the hanger frame is provided with an arcuate flange 26 which bears at its upper face at 27 against the underside of an intermediate frame-part of the cutter frame. The cutter bar and cutter frame section are provided with cooperating means whereby the cutter bar can be selectively locked from pivotal movement in any one of three positions, namely, a position extending laterally from either side of the machine, substantially at right angles to the longitudinal axis of the machine, or a position longitudinal with respect to said axis. To lock the cutter bar in any one of the three positions above referred to, there is provided, as shown in Figs. 3, 16 and 17, a vertically sliding bolt 28 arranged at the rearward portion of the cutter frame section. This bolt comprises a bar 29, rectangular in cross section and guided for vertical sliding movement in a rectangular recess 30. This recess is formed by a vertical groove in the outer part of the cutter frame and a cover plate secured to the cutter frame as by set screws. Opening into the upper side of the recess 30 is a narrower recess 31 which receives a guiding lug 32 extending centrally upwardly from the rectangular bar and a pair of compression springs 33 arranged one on either side of the guiding lug, and said springs bear at their upper ends against the frame and at their lower ends against the upper face of the rectangular bar. Extending from the lower face of the rectangular bar is a cylindrical projection 34 which is adapted to extend into any one of three radial locking grooves 35 provided in the upper face of the arcuate flange 26 of the bar hanger frame 19. The rectangular bar has a longitudinal slot 36 extending from end to end thereof, and through this slot there extends a pin 37 which is of a diameter substantially equal to the depth of the slot. At each end of the pin 37, and integral therewith, there is provided a cylindrical cam member 38, these cam members arranged with their axes eccentric to the axis of the pin (Fig. 17). To facilitate assembly, the cam and pin structure is composed of two identic parts connected together by a dowel pin, in the manner shown in Fig. 17. The cam members 38 fit rotatably in bearings in the cutter frame section in the manner shown, and the ends of the cam members project laterally from the latter, the cam members being provided with apertures 39 for the insertion of a bar or other turning instrument, for the purpose of manually actuating the cam members and the pin whereby the rectangular bar may be lifted for unlocking the hanger frame to permit turning of the hanger frame and consequently of the cutter bar about its pivotal axis relative to the cutter frame. The unlocking movement compresses the springs and carries the eccentric cam members beyond their dead centers. During adjustment of the cutter bar about its pivot, the lower face of the cylindrical projection rides on the upper face of the hanger frame until one of the radial locking grooves in the hanger frame is positioned below the said projection, when the springs will automatically depress the bolt so that the locking projection will enter the radial groove. During this movement of the bolt, the pin and cam members are returned to their former positions.

As previously mentioned, the mining machine may be moved over the mine floor during the cutting operation and maneuvering of the machine with respect to the coal face, by the means of the haulage drum 8 having wound thereon the feed cable 9. Arranged at opposite sides of the haulage drum on the feed frame section are horizontal guide sheaves 40 for guiding the feed cable relative to the haulage drum during various operations of the machine. The feed cable has a hook 41 at its free end whereby it may be attached to the bar hanger frame 19, and the hanger frame is provided with peripheral slots 42 for that purpose. When so attached, and when the locking bolt 28 has been withdrawn, the feed cable may be wound in by the haulage drum to effect swinging of the cutter bar about its pivotal axis. During feeding of the machine along the coal face, the feed cable extends from the haulage drum and its free end is connected to a suitable anchor or jack located in advance of the machine adjacent the coal face, and as the cable is wound in, the machine is fed bodily over the mine floor toward the anchor or jack.

Figure 9:
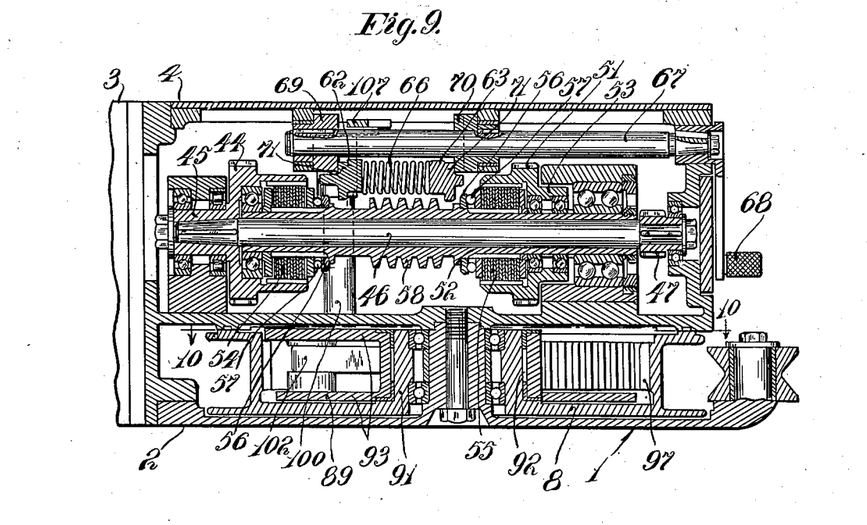
Fig. 9 is a view in longitudinal vertical section taken substantially on line 9—9 of Figs. 1 and 6.
Figure 15:
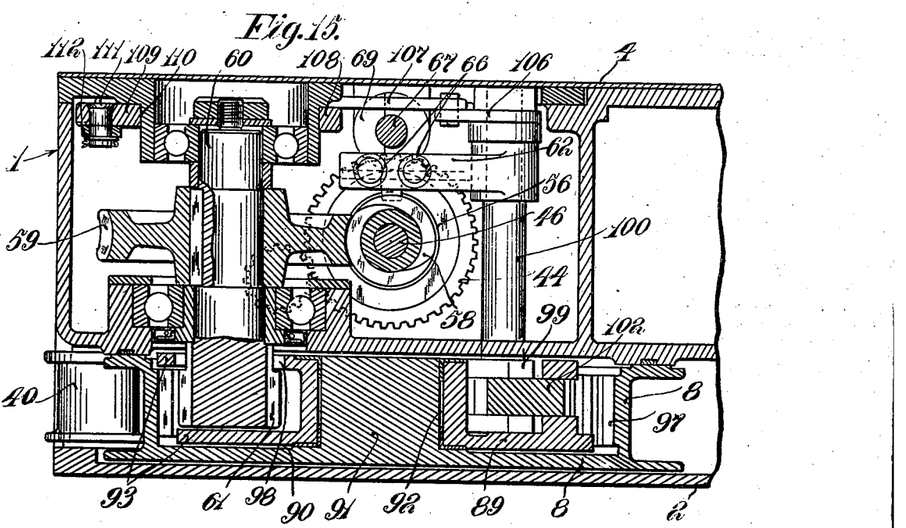
Fig. 15 is a transverse vertical sectional view taken substantially on line 15—15 of Fig. 6.

Referring now to the improved transmission mechanism between the motor and the haulage drum 8, it will be noted that keyed to the forward end of the motor power shaft 10 is a spur pinion 43 meshing with a spur gear 44 having its hub 45 journaled within bearings supported within the feed frame section. Keyed to the hub of the spur gear 44, in coaxial relation therewith, is a transmission shaft 46 arranged with its axis horizontal and extending longitudinally of the machine frame, as shown in Fig. 9. The forward end of this shaft is journaled within a bearing supported within the forward portion of the feed frame, and keyed to the front end of the shaft is a spur gear 47 meshing with a spur gear 48. The gear 48 is keyed to a counter-shaft 49 arranged parallel with the shaft 46 and likewise suitably journaled within the feed frame. Secured to and driven by the counter-shaft is a spur gear 50 meshing with a spur gear 51 herein arranged coaxial with the spur gear 44 and shaft 46. The spur gear 44 constitutes the high speed terminal gear of the high speed transmission and the gear 51 constitutes the low speed terminal gear of the low speed transmission. The transmission shaft 46 is surrounded by a coaxial shaft 52 in the form of a sleeve, journaled at its opposite ends respectively within a bearing supported within the gear 44 and bearings supported within the feed frame. The low speed terminal gear 51 has its hub 53 journaled on bearings supported by the shaft 52. The high speed terminal gear 44 is connectible to the sleeve-like shaft 52 by a friction disc clutch 54, while the low speed terminal gear 51 is connectible to the shaft 52 by a similar friction disc clutch 55. The shaft 52 has rotatably and slidably mounted on it clutch applying ring members 56, which engage ball thrust bearings 57 whereby on sliding of the rings along the shaft towards and from the clutches, the latter may be applied and released. This movement of the rings 56 is accomplished by the operation of a shipper mechanism to be hereinafter described. The intermediate portion of the shaft 52 has a worm 58 secured thereto which meshes with a worm wheel 59 keyed to a vertical shaft 60 suitably journaled within the feed frame. The lower end of this vertical shaft is provided with a driving pinion 61 (Figs. 13 and 15) for the haulage drum 8, which may be driven in one direction or the other through reverse gearing referred to hereinafter. The counter-shaft 49 of the low speed transmission also drives a "pulse" mechanism hereinafter particularly described, for alternately decreasing and increasing the loading pressure on the low speed clutch, so that the haulage drum may be intermittently driven. The "pulse" mechanism is preferably adjustable so that the intermittent drive is variable and so that it may be put out of action for obtaining a continuous drive of the haulage drum at a low speed.

The improved shipper mechanism for the high and low speed disc clutches 54 and 55 comprises two shipper yokes 62 and 63 mounted for swinging movement on parallel vertical shafts respectively, and these shipper yokes are pressed toward their respective clutch applying rings 56 by means of coil springs 66, 66 located between the inner faces of the shipper yokes, as clearly shown in Fig. 9, but means is provided whereby the shipper yokes may be manually adjusted so that either one is positively held against movement which would cause engagement of its respective friction clutch with its clutch applying ring 56 while the other, under the action of the springs 66, presses on its clutch applying ring with consequent engagement of the other clutch. The adjustment means comprises a horizontal spindle 67 mounted for rotation in the feed frame and having at its outer end, exterior of the feed frame, an operating handle 68. The spindle has keyed thereto a pair of cams 69 and 70, each having a high and low part, the cams being arranged to engage lugs 71 integral with the shipper yokes, the arrangement being such that on turning the spindle 67 from one position to the other, the high part of one cam comes into engagement with the lug of the shipper yoke with which it is integral, positively to move it into clutch disengaging position, and the high part of the other cam becomes disengaged from its lug so that the lower part of this cam permits the respective shipper yoke, under the action of springs 66, to press against the clutch applying ring, so that the clutch is pressed into engagement, it being understood that these conditions will obtain until the spindle is moved in the opposite direction by the operating handle 68.

The "pulse" feed mechanism comprises a worm 75 keyed to the counter-shaft 49 of the low speed transmission, which worm meshes with a worm wheel 76 keyed to a second counter-shaft 77, the latter being vertically disposed and suitably journaled within bearings supported within the feed frame. The second counter-shaft carries a cam 78, which is adapted to oscillate a "pulse" lever 79. This "pulse" lever is pivoted at one end and adapted to engage at its other end the outer side of the shipper yoke 63 for the low speed clutch 55, whereby, when the slow speed drive is employed, the clutch may be intermittently released and engaged so that the haulage drum will be intermittently rotated. The intermittent feed may be varied by adjusting the position of the "pulse" lever 79, and this adjustment may be effected by pivoting the lever at 80 to one arm of a second lever 81 in turn pivotally mounted intermediate its ends at 82 on the feed frame and providing the other arm of the lever 81 with an abutment 83 which is engaged by an axially movable rod 84 having a screw threaded nut portion 85 in engagement with a rotatable screw 86 fixed against axial movement with respect to the feed frame and having an operating knob 87 on the exterior of the frame. By turning the knob, the second lever 81 may be moved about its pivotal axis so as to vary the location of the fulcrum point of the "pulse" lever 79, consequently to vary the stroke imparted to it by the cam.

Figure 10:
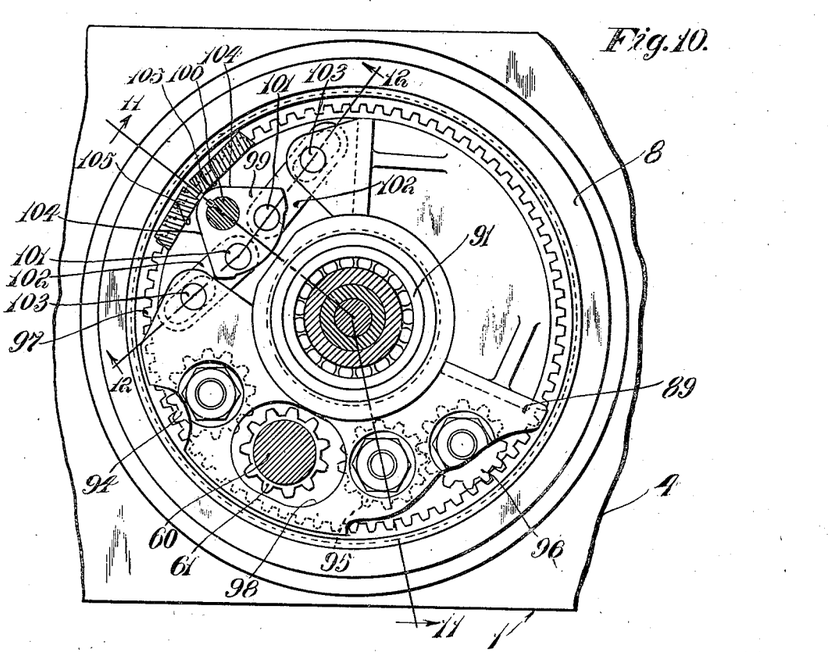
Fig. 10 is a horizontal sectional view taken substantially on line 10—10 of Fig. 9.
Figure 11:
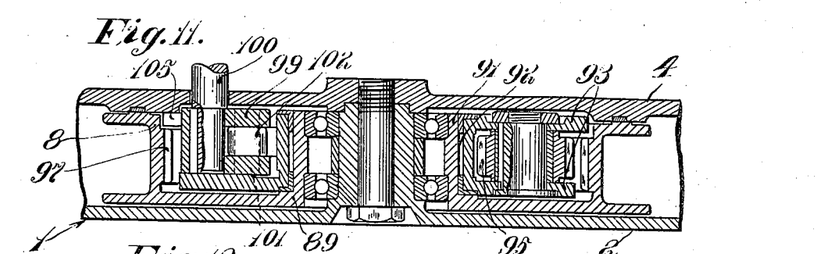
Fig. 11 is a detail vertical sectional view taken substantially on line 11—11 of Fig. 10.
Figure 12:
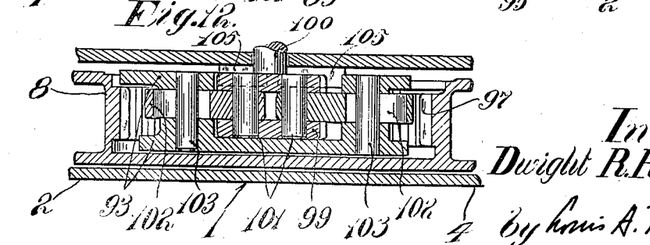
Fig. 12 is a detail vertical sectional view taken substantially on line 12—12 of Fig. 10.

Means is also provided whereby the haulage drum 8 may be driven in either direction of rotation at fast or slow speed, and for this purpose a gear wheel carrier 89 is mounted centrally in a recess 90 in the haulage drum 8 and surrounds the central hub of the haulage drum, so as to be adjustable relative to the drum on the drum axis about a central boss 91 extending into a central aperture 92 in the carrier. The central boss 91, as shown in Fig. 9, preferably supports bearings on which the hub of the haulage drum 8 is journaled. The carrier has superimposed parallel flanges 93, 93 between which are rotatably mounted three gear pinions 94, 95 and 96, the one of these three pinions numbered 94 being in constant mesh with internal gear teeth 97 on the haulage drum 8, and the forward drive operates the drum so that it hauls on the rope for moving the machine for cutting a kerf. This forward drive pinion is located on one side of said drive pinion 61 of the haulage drum, which latter pinion is also located between said flanges 93 with the vertical shaft carrying it extending through an elongated slot 98 in the upper flange. The other two gear pinions 95, 96 are constantly in mesh with each other and are located on the other side of the driving pinion 61 for the haulage drum, the one 95 of the two being an idler gear and the other in constant mesh with the internal gear teeth 97 on the haulage drum. As will now be appreciated, by moving the carrier 89 about the central boss 91, one or the other of the carrier gears 94, 95 will move into meshing engagement with the drive pinion 61, and consequently the haulage drum 8 may be driven in either one direction or the other, and when the carrier is in intermediate or neutral position, as shown in Fig. 10, the haulage drum will remain stationary.

Figure 6:
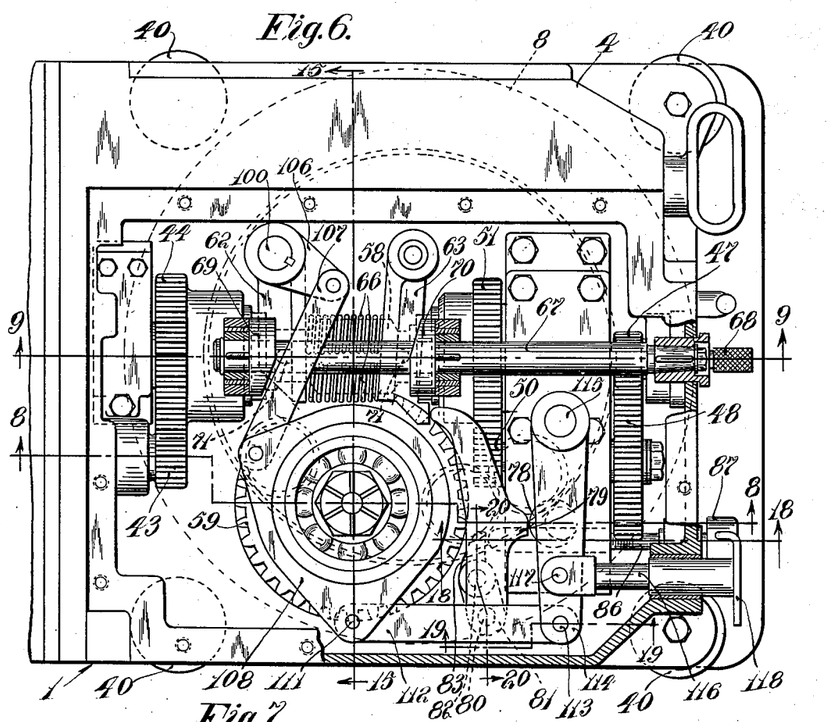
Fig. 6 is an enlarged plan view of the feeding end of the machine, with the top cover removed to illustrate details of the internal construction, certain parts being shown in section to illustrate structural details.
Figure 7:
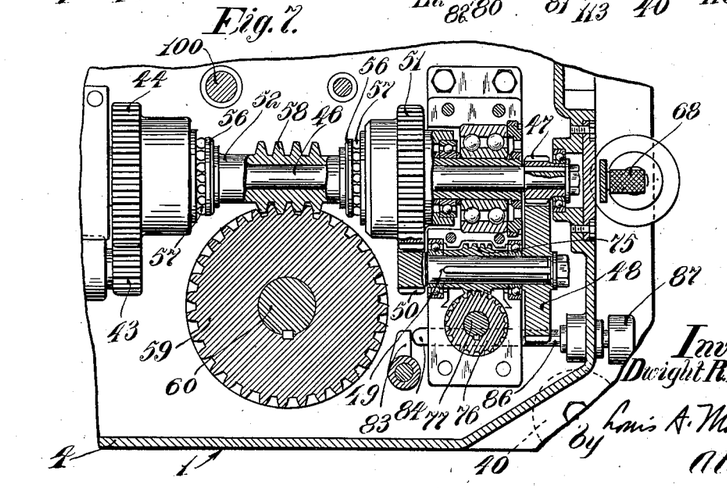
Fig. 7 is a horizontal sectional view taken substantially on line 7—7 of Fig. 8.
Figure 8:
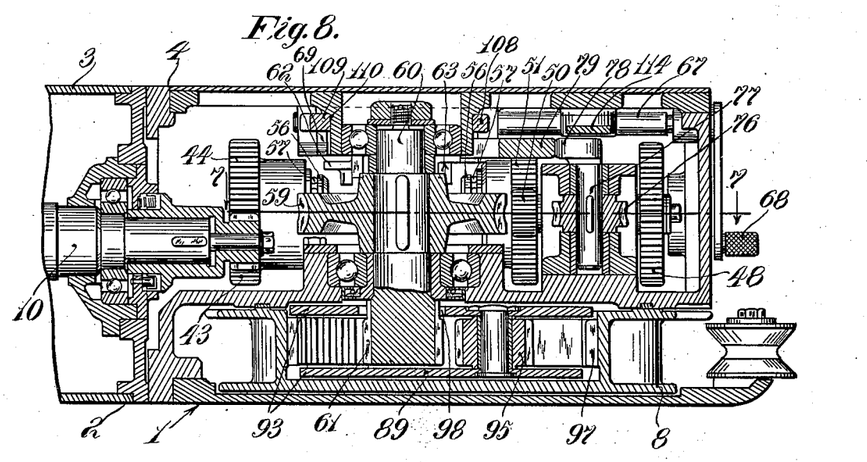
Fig. 8 is a view in longitudinal vertical section taken substantially on line 8—8 of Fig. 6.
Figure 13:
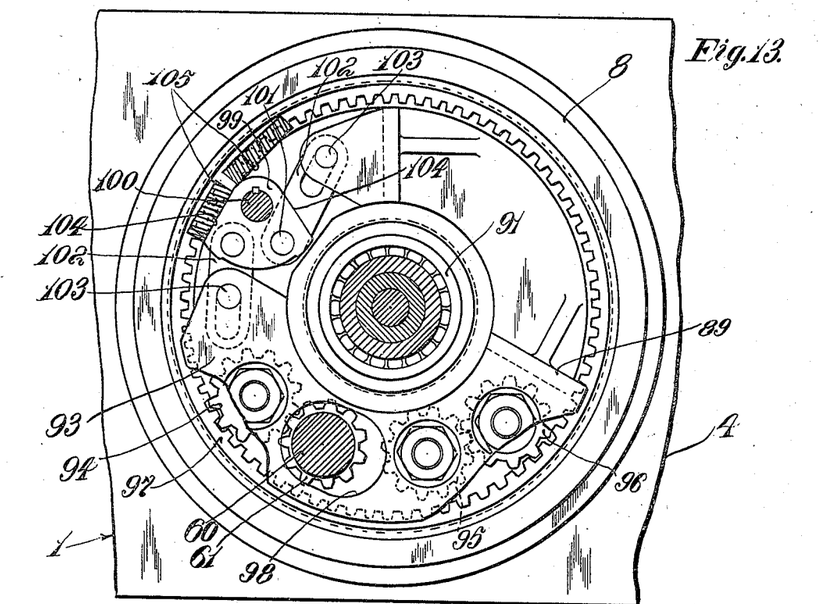
Fig. 13 is a view similar to Fig. 10, showing the parts in forward feed effecting position.
Figure 14:
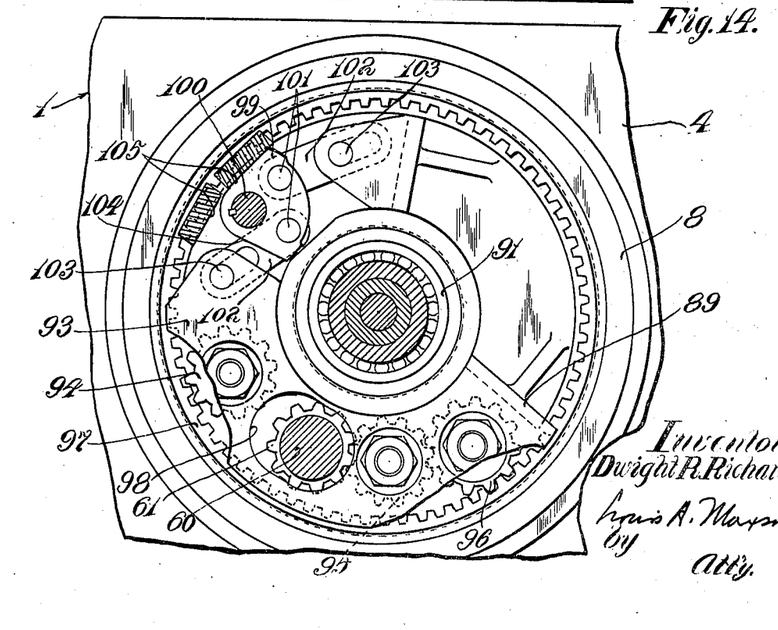
Fig. 14 is a view similar to Fig. 10, showing the parts in reverse feed effecting position.

Means whereby the carrier may be adjusted into either one of these three positions comprises a toggle lever 99, which is of sector shape and keyed to a toggle operating shaft 100, this shaft preferably being that on which the fast speed clutch shipper yoke 62 is pivoted. The pivotal axis lies adjacent the inner ends of the radii of the sector. To each side of the sector, remote from its axis of movement, there is pivotally connected at 101 a toggle link 102, each link being connected at its opposite end at 103 by a pin and slot connection to the carrier 89. The circumference of the sector has its ends formed as plane surfaces 104, which are adapted to engage plane surfaces 105 on the frame so as to prevent further movement of the sector when it has been moved to a position for forward or reverse drive of the haulage drum. Assuming the carrier 89 and the operating parts to be in neutral position (see Fig. 10), the links lie with the pins at the inner ends of the slots in the toggle links, and upon rotation of the toggle shaft in one direction, the carrier may be rotated about its axis so that it will be positioned for driving the haulage drum for forward or reverse movement of the machine over the mine floor. The forward drive position is shown in Fig. 13 and the reverse drive position in Fig. 14. The means for actuating the toggle sector 99 to move the carrier 89 into its different positions comprises a lever 106 keyed to the toggle shaft 100 and pivotally connected to a link 107 in turn pivotally connected to a plate 108. This plate has an annulus 109 rotatably mounted at 110 on a bearing boss integral with the upper portion of the feed frame (see Figs. 8 and 15), and is pivotally connected at 111 to a link 112. This link is pivotally connected at 113 to a lever 114 pivotally mounted at 115 for horizontal swinging movement. An operating rod 116 is guided for axial movement within the front end of the feed frame (see Fig. 6), and is pivotally connected at 117 to the lever 114. The rod 116 is provided at the exterior of the feed frame with an operating handle 118. It will thus be seen that by manipulating the handle 118 the lever, links and plate may be actuated to move the carrier 89 into either its forward, reverse or neutral position. The load on the teeth of the gears holds the gears in their proper driving relation when the toggle is thrown past center.

In Figs. 21 to 24, inclusive, there is shown a modified form of clutch control mechanism. This clutch control mechanism comprises a spring casing 120 having cylindrical end portions 121 guided within bores formed within guiding brackets 122 integral with the machine frame. The upper surface of this casing is flattened at 123 for engagement with a plane surface on the machine frame to prevent rotation of the casing within its guiding bores. Extending axially through the casing is a control rod 124, and arranged in the casing and encircling the control rod is a clutch loading spring 125 compressed to a predetermined load. The spring is held under compression between end thrust bearings 126, 126, one bearing abutting against a nut 127 threaded within and fixed by a screw 128 to the casing and the other bearing abutting a sleeve 129 on the rod, the sleeve in turn engaging a washer of an adjusting nut 130 threaded on the inner end of the rod. When the control rod is in the position shown in Fig. 22, the inner thrust bearing also abuts a shoulder 131 on the casing so that at that time the spring acts between the casing ends, and the clutches are both released. The casing 120 has a depending lug 132 carrying adjusting screws 133, 133 respectively engageable with the shipper yokes 62 and 63 of the high and low speed clutches 54 and 55 shown in Fig. 9. These screws 133 may be adjusted to compensate for loose joints, wear on the clutch plates, etc. The operating means for the control rod 124 comprises a rotary sleeve 134 mounted in a bore in the machine frame and having a cam slot 135 within which a pin 136, fixed to the frame, projects. Threaded within a nut 137 integral with the sleeve, is a screw 138 connected, as by a coupling 139, to the control rod 124. Pivotally connected to the screw at its outer end at 140 is a handle 141 having a projection 142 insertible in a slot 143 in the sleeve 134. A spring pressed plunger 144 presses against the control rod 124 to prevent inadvertent rotation of the rod due to vibration. When it is desired to apply one clutch or the other, the operator may swing the handle 141 into the dotted-line position shown in Fig. 22 to move the projection 142 within the sleeve slot 143; and when the handle is rotated the sleeve is turned, thereby moving the cam slot 135 relative to the pin 136 to effect axial movement of the sleeve and the control rod 124 into clutch-applying position, the pin 136 engaging the transverse end portion of the cam slot at that time to lock the sleeve in position. The handle 141 is then swung inwardly into the full-line position shown in Fig. 22, thereby to release the handle projection from the sleeve slot; and upon rotation of the handle into one of the dotted-line positions shown in Fig. 24, the screw 138 is rotated relative to the nut to move the control rod 124 axially, thereby to cause the spring 125 to be further compressed and allow the spring pressure to act against the clutch shipper yoke instead of its end abutment on the spring casing. When the cam sleeve and screw are rotated in the opposite direction by the handle, the shipper yoke of the other clutch is of course operated. The cam slot on the sleeve locks the clutch operating means in position to apply one clutch while operation of the other clutch is prevented, this being particularly desirable to allow for adequate motion of the "pulsing" feed when the low speed clutch is in operation. The "pulsing" feed operates in the manner described above in regard to the other form of the invention. It will thus be seen that the spring 125 acts on the spring casing when the clutch control rod is in neutral position, and when the casing is moved axially within its guide bores the load of the spring is transferred from the spring casing to the clutch shipper yoke, thereby yieldably to apply the clutch under a predetermined load determined by the setting of the clutch loading spring.

Otherwise, this form of the invention is the same as that described above.

Figure 1:
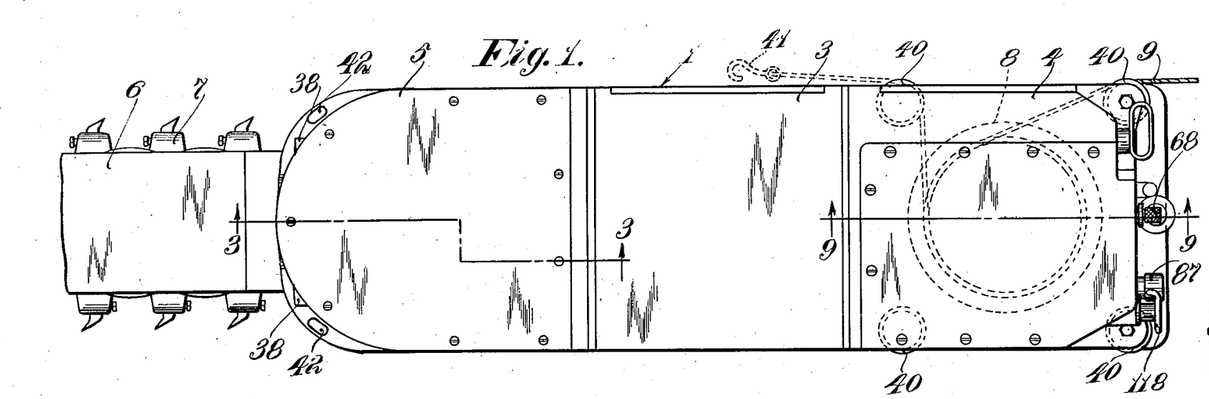
Fig. 1 is a top plan view of a mining machine constructed in accordance with an illustrative embodiment of the invention.
Figure 2:
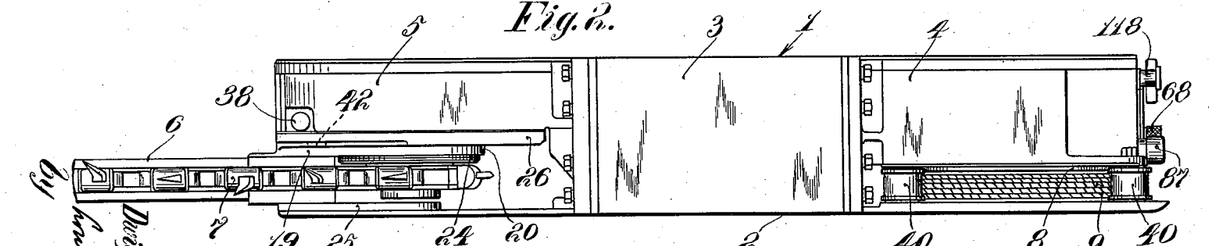
Fig. 2 is a side elevational view of the mining machine shown in Fig. 1.

The general mode of operation of the improved mining machine is as follows. The machine is maneuvered at a relatively fast moving speed with respect to the coal face by the haulage drum 8 under the control of the friction clutch 54 of the high speed transmission. When the machine is properly located with respect to the coal face in a position arranged lengthwise of the face, the feed cable 9 is connected to the cutter bar, and when the haulage drum 8 is rotated at a relatively low speed under the control of the clutch 55 of the low speed transmission, the feed cable is wound in to effect swinging of the cutter bar about its pivot from the position shown in Fig. 1 to a lateral position substantially at right angles to the machine frame, thereby to effect sumping of the cutter bar beneath the coal. The cutter bar is then locked in position by the locking bolt 28, and the feed cable is disconnected from the cutter bar and extended from the haulage drum forwardly of the machine to a suitable anchor or jack located adjacent the coal face. As the haulage drum is rotated at a relatively low speed under the control of the low speed clutch, the feed cable is wound in, thereby moving the machine bodily along the coal face to effect its rectilinear cutting function. The haulage drum may be rotated through a wide range of low feeding speeds under the control of the "pulse" mechanism, and when rotated at either a high or a low speed, the active clutch is held in its applied position by the coil springs 66, and the clutch is adapted to slip upon overload of the mechanism, thereby to prevent damage of the machine in the event the cutter bar meets an obstruction. The high and low speed clutches are manually released by the shipper mechanism, and are automatically held applied under a predetermined load by the coil springs. The haulage drum may be rotated in a direction to unwind the cable at either a low or a high speed simply by shifting the position of the gear carrier 89 to bring either the gear 94 or the gear 95 into meshing engagement with the drive pinion 61.

The mode of operation of the modified construction shown in Figs. 21 to 24, inclusive, is the same as that above described, with the exception that the active clutch is maintained loaded by the coil spring 125 instead of the springs 66.

As a result of this invention, it will be noted that an improved coal mining machine is provided having improved feeding mechanism whereby the machine may be fed and controlled in an improved manner. It will further be noted that by the provision of the spring-loaded clutches and the associated variable speed "pulse" mechanism, it is possible to effect feed of the machine through a wide range of low intermittent feeding speeds between zero and a predetermined maximum low speed and continuously at said predetermined maximum low speed, the clutch loading springs adapted to yield upon overloading of the clutches, thereby to prevent damage to the machine in the event of overloading of the cutting mechanism. It will further be evident that by the provision of the reverse drive for the haulage drum, the latter may be rotated at either a high or low speed and in either of opposite directions at either speed. Other uses and advantages of the improved mining machine will be clearly apparent to those skilled in the art.

While there are in this application specifically described one form and a modification which the invention may assume in practice, it will be understood that this form and the modification of the same are shown for purposes of illustration and that the invention may be further modified and embodied in various other forms without departing from its spirit or the scope of the appended claims.

What I claim as new and desire to secure by Letters Patent is:

1. A mining machine transmission mechanism comprising, in combination, a member to be driven and means for driving said member selectively at high speed through a high speed transmission means or at low speed through a low speed transmission means, each of which means includes a friction clutch and spring clutch-loading means, and means for at will continuously loading said high speed clutch with said spring clutch-loading means for driving said member at a uniform high speed, or continuously loading said low speed clutch with said spring clutch-loading means for driving said member continuously at low speed, or automatically intermittently loading said low speed clutch with said spring clutch-loading means for driving said member intermittently at low speed.

2. A mining machine transmission mechanism comprising, in combination, a member to be driven and means for driving said member selectively at high speed through a high speed transmission means or at low speed through a low speed transmission means, each of which means includes a friction clutch and spring clutch-loading means, and means for at will continuously loading said high speed clutch with said spring clutch-loading means for driving said member at a uniform high speed, or continuously loading said low speed clutch with said spring clutch-loading means for driving said member continuously at low speed, or automatically intermittently loading said low speed clutch with said spring clutch-loading means for driving said member intermittently at low speed, said clutch-loading means being operable to apply variable loading pressures to each of said clutches.

3. A mining machine transmission mechanism comprising, in combination, a member to be driven and means for driving said member selectively at high speed through a high speed transmission means or at low speed through a low speed transmission means, each of which means includes a friction clutch and spring clutch-loading means, and means for at will continuously loading said high speed clutch with said spring clutch-loading means for driving said member at a uniform high speed, or continuously loading said low speed clutch with said spring clutch-loading means for driving said member continuously at low speed, or automatically intermittently loading said low speed clutch with said spring clutch-loading means for driving said member intermittently at low speed, said spring clutch-loading means comprising a pair of pivoted shipper yokes and spring means for urging said yokes into clutch applying position and said means operable for loading and unloading the clutches being adapted to hold said yokes in clutch disengaged position and to be operated to move either yoke out of clutch engaging position and simultaneously to release the other yoke for movement in the direction to load the other clutch through its spring-loading means.

4. A mining machine transmission mechanism comprising, in combination, a member to be driven and means for driving said member selectively at high speed through a high speed transmission means or at low speed through a low speed transmission means, each of which means includes a friction clutch and spring clutch-loading means, and means for at will continuously loading said high speed clutch with said spring clutch-loading means for driving said member at a uniform high speed, or continuously loading said low speed clutch with said spring clutch-loading means for driving said member continuously at low speed, or automatically intermittently loading said low speed clutch with said spring clutch-loading means for driving said member intermittently at low speed, said spring clutch-loading means comprising a pair of pivoted shipper yokes and spring means for urging said yokes into clutch applying position and said means operable for loading and unloading the clutches being adapted to hold said yokes in clutch disengaged position and to be operated to move either yoke out of clutch engaging position and simultaneously to release the other yoke for movement in the direction to load the other clutch through its spring-loading means, said shipper yokes being mounted on stationary axes and said loading means being adapted to apply a loading force in a direction axially of said spring-loading means.

5. A mining machine transmission mechanism comprising, in combination, a member to be driven and means for driving said member selectively at high speed through a high speed transmission means or at low speed through a low speed transmission means, each of which means includes a friction clutch and spring clutch-loading means, and means for at will continuously loading said high speed clutch with said spring clutch-loading means for driving said member at a uniform high speed, or continuously loading said low speed clutch with said spring clutch-loading means for driving said member continuously at low speed, or automatically intermittently loading said low speed clutch with said spring clutch-loading means for driving said member intermittently at low speed, said spring clutch-loading means comprising a pair of pivoted shipper yokes and spring means located between said pivoted shipper yokes for urging said yokes into clutch applying position and said means operable for loading and unloading the clutches being adapted to hold said yokes in clutch disengaged position and to be operated to move either yoke out of clutch engaging position and simultaneously to release the other yoke for movement in the direction to load the other clutch through its spring-loading means.

6. A mining machine transmission mechanism comprising, in combination, a member to be driven and means for driving said member selectively at high speed through a high speed transmission means or at low speed through a low speed transmission means, each of which means includes a friction clutch and spring clutch-loading means, and means for at will continuously loading said high speed clutch with said spring clutch-loading means for driving said member at a uniform high speed, or continuously loading said low speed clutch with said spring clutch-loading means for driving said member continuously at low speed, or automatically intermittently loading said low speed clutch with said spring clutch-loading means for driving said member intermittently at low speed, said spring clutch-loading means comprising a pair of pivoted shipper yokes and spring means for urging said yokes into clutch applying position and said means operable for loading and unloading the clutches being adapted to hold said yokes in clutch disengaged position and to be operated to move either yoke out of clutch engaging position and simultaneously to release the other yoke for movement in the direction to load the other clutch through its spring-loading means, said loading means comprising a pair of rotatably mounted cams adapted and arranged so that by adjustment of the cams the operation of said yokes may be controlled.

7. A mining machine transmission mechanism comprising, in combination, a member to be driven and means for driving said member selectively at high speed through a high speed transmission means or at low speed through a low speed transmission means, each of which means includes a friction clutch and spring clutch-loading means, and means for at will continuously loading said high speed clutch with said spring clutch-loading means for driving said member at a uniform high speed, or continuously loading said low speed clutch with said spring clutch-loading means for driving said member continuously at low speed, or automatically intermittently loading said low speed clutch with said spring clutch-loading means for driving said member intermittently at low speed, said means for intermittently loading the low speed clutch comprising a pivotally mounted pulse lever in engagement with the shipper yoke of the low speed clutch and a cam driven by the low speed transmission means and arranged to oscillate said pivotally mounted lever.

8. A mining machine transmission mechanism comprising, in combination, a member to be driven and means for driving said member selectively at high speed through a high speed transmission means or at low speed through a low speed transmission means, each of which means includes a friction clutch and spring clutch-loading means, and means for at will continuously loading said high speed clutch with said spring clutch-loading means for driving said member at a uniform high speed, or continuously loading said low speed clutch with said spring clutch-loading means for driving said member continuously at low speed, or automatically intermittently loading said low speed clutch with said spring clutch-loading means for driving said member intermittently at low speed, said means for intermittently loading the low speed clutch comprising a pivotally mounted pulse lever in engagement with the shipper yoke of the low speed clutch and a cam driven by the low speed transmission means and arranged to oscillate said pivotally mounted lever, said pulse lever being adapted intermittently to release the clutch from said clutch-loading means and to permit the application of said spring clutch-loading means.

9. A mining machine transmission mechanism comprising, in combination, a member to be driven and means for driving said member selectively at high speed through a high speed transmission means or at low speed through a low speed transmission means, each of which means includes a friction clutch and spring clutch-loading means, and means for at will continuously loading said high speed clutch with said spring clutch-loading means for driving said member at a uniform high speed, or continuously loading said low speed clutch with said spring clutch-loading means for driving said member continuously at low speed, or automatically intermittently loading said low speed clutch with said spring clutch-loading means for driving said member intermittently at low speed, said means for intermittently loading the low speed clutch comprising a pivotally mounted pulse lever having its outer end in engagement with the shipper yoke of the low speed clutch and a cam driven by the low speed transmission means and arranged to oscillate said pivotally mounted lever, said cam engaging said lever intermediate the outer end of said lever and the lever pivot.

10. A mining machine transmission mechanism comprising, in combination, a member to be driven and means for driving said member selectively at high speed through a high speed transmission means or at low speed through a low speed transmission means, each of which means includes a friction clutch and spring clutch-loading means, and means for at will continuously loading said high speed clutch with said spring clutch-loading means for driving said member at a uniform high speed, or continuously loading said low speed clutch with said spring clutch-loading means for driving said member continuously at low speed, or automatically intermittently loading said low speed clutch with said spring clutch-loading means for driving said member intermittently at low speed, said means for effecting intermittent loading of the low speed clutch being adjustable to vary the interval of time between each application and release of said clutch.

11. A mining machine transmission mechanism comprising, in combination, a member to be driven, and means for driving said member selectively at different speeds including a high speed transmission means incorporating a friction clutch and a low speed transmission means incorporating another friction clutch, means including spring clutch-loading means for at will continuously loading said high speed clutch for driving said member at a uniform high speed, and means including spring clutch-loading means for selectively continuously loading said low speed clutch for driving said member continuously at low speed or for automatically intermittently loading said low speed clutch to drive said member intermittently at low speed.

12. A mining machine transmission mechanism comprising, in combination, a member to be given, a high speed transmission means through which said member may be driven, a low speed transmission means through which said member may be driven, each of said means including a friction clutch, spring loading means for said high speed clutch for effecting uniform high speed drive of said member, and spring loading means for said low speed clutch for alternatively continuously loading said low speed clutch to effect continuous low speed drive of said member or for automatically intermittently loading said low speed clutch to effect intermittent low speed drive of said member.

13. A mining machine transmission mechanism comprising, in combination, a member to be driven and means for driving said member at a high speed through a high speed transmission means or at a low speed through a low speed transmission means, each of which means includes a friction clutch a predetermined loading of which renders it operative to effect drive, and means for alternatively loading said clutches including a yielding clutch-loading means and means for rendering the same effective to load either of said clutches separately at will.

14. A mining machine transmission mechanism comprising, in combination, a member to be driven and means for driving said member at a high speed through a high speed transmission means or at a low speed through a low speed transmission means, each of which means includes a friction transmission device whose predetermined loading renders that particular means operative to transmit drive, and means for loading said devices alternatively including yielding loading means and means for rendering said yielding loading means effective to load either one of said devices separately at will.

15. A mining machine transmission mechanism comprising, in combination, a member to be driven and means for driving said member at a high speed through a high speed transmission means or at a low speed through a low speed transmission means, each of which means includes a friction clutch whose predetermined loading renders that particular means operative to transmit drive, and means for loading said clutches alternatively including shipper levers for said clutches respectively, yielding clutch-loading means, and means for rendering said yielding clutch loading means effective to act selectively on said levers to load either of said clutches separately at will.

16. A mining machine transmission mechanism comprising, in combination, a member to be driven and means for driving said member at a high speed through a high speed transmission means or at a low speed through a low speed transmission means, each of which means includes a friction clutch whose predetermined loading renders that particular means operative to transmit drive, and means for loading said clutches alternatively including shipper levers for said clutches respectively, yielding clutch-loading means including a yielding element common to both clutches, and means for rendering said yielding clutch-loading means effective to act selectively on said levers to load either of said clutches separately at will.

DWIGHT R. RICHARDS.

CERTIFICATE OF CORRECTION.

Patent No. 2,262,048.  November 11, 1941.

DWIGHT R. RICHARDS.

It is hereby certified that error appears in the printed specification of the above numbered patent requiring correction as follows: Page 2, second column, line 48, strike out "the" before "means"; page 5, first column, line 46, strike out "either the gear 94 or"; page 7, first column, line 57, claim 12, for "given" read --driven--; and that the said Letters Patent should be read with this correction therein that the same may conform to the record of the case in the Patent Office.

Signed and sealed this 16th day of June, A. D. 1942.

Henry Van Arsdale,
Acting Commissioner of Patents.

(Seal)